(12) United States Patent
Guercioni (10) Patent No.: US 9,300,193 B2
(45) Date of Patent: *Mar. 29, 2016

(54) METHODS AND APPARATUS FOR TWISTING ROTOR AND STATOR CONDUCTOR ENDS

(75) Inventor: Sante Guercioni, Teramo (IT)

(73) Assignee: Tecnomatic, S.p.A., Teramo, Corropoli (IT)

(*) Notice: Subject to any disclaimer, the term of this patent is extended or adjusted under 35 U.S.C. 154(b) by 0 days.

This patent is subject to a terminal disclaimer.

(21) Appl. No.: 13/492,316

(22) Filed: Jun. 8, 2012

(65) Prior Publication Data

US 2013/0111737 A1     May 9, 2013

Related U.S. Application Data

(63) Continuation of application No. 11/880,290, filed on Jul. 20, 2007, now Pat. No. 8,215,000.

(51) Int. Cl.
*H02K 15/085* (2006.01)
*H02K 15/09* (2006.01)
*H02K 15/00* (2006.01)
*H02K 15/04* (2006.01)

(52) U.S. Cl.
CPC ........ *H02K 15/0087* (2013.01); *H02K 15/0031* (2013.01); *H02K 15/0056* (2013.01); *H02K 15/0428* (2013.01); *Y10T 29/49009* (2015.01); *Y10T 29/49012* (2015.01); *Y10T 29/53161* (2015.01)

(58) Field of Classification Search
CPC .......... H02K 15/0087; H02K 15/0428; Y10T 29/49009; Y10T 29/49012
USPC ............. 29/596, 598, 732, 735, 736; 310/201
See application file for complete search history.

(56) References Cited

U.S. PATENT DOCUMENTS

| | | | |
|---|---|---|---|
| 1,332,154 | A | 2/1920 | Apple |
| 1,555,931 | A | 10/1925 | Apple |
| 2,387,885 | A | 10/1945 | Davis |
| 2,400,739 | A | 5/1946 | Burge |
| 2,476,743 | A | 7/1949 | Leece |

(Continued)

FOREIGN PATENT DOCUMENTS

| | | |
|---|---|---|
| EP | 0881752 | 1/2001 |
| EP | 1376816 | 1/2004 |

(Continued)

OTHER PUBLICATIONS

"Non-Final Office Action Dated Jul. 13, 2010", Chinese Patent Application No. 200810132526.X.

(Continued)

*Primary Examiner* — Livius R Cazan
(74) *Attorney, Agent, or Firm* — Ropes & Gray LLP (57) ABSTRACT

Methods and apparatus for twisting rectangular rotor and stator conductor ends whereby most if not all conductor ends are bent at once, radially adjacent ends being bent in opposite directions. A lost motion member may be used to bend selected conductors through lesser angles for such purposes as phase interconnection and power leads. The rectangular conductors are retained against twisting so that flat conductors will bend about an axis perpendicular to the larger dimension of the conductor cross section. Various features of the methods and apparatus are disclosed.

20 Claims, 6 Drawing Sheets

(56) References Cited

U.S. PATENT DOCUMENTS

| | | |
|---|---|---|
| 2,476,745 A | 7/1949 | Leece |
| 3,803,951 A | 4/1974 | Bagley |
| 3,999,093 A | 12/1976 | Kirtley |
| 4,437,230 A | 3/1984 | Greutmann |
| 5,192,087 A * | 3/1993 | Kawashima et al. ........... 279/71 |
| 5,266,858 A | 11/1993 | Ohmi et al. |
| 5,363,546 A | 11/1994 | Bradtmueller et al. |
| 5,495,131 A | 2/1996 | Goldie et al. |
| 5,522,125 A | 6/1996 | Bradtmueller et al. |
| 5,998,903 A | 12/1999 | Umeda et al. |
| 6,144,136 A | 11/2000 | Umeda et al. |
| 6,249,956 B1 | 6/2001 | Maeda et al. |
| 6,260,898 B1 * | 7/2001 | Kano et al. .................... 294/188 |
| 6,314,780 B1 | 11/2001 | Naka et al. |
| 6,339,871 B1 | 1/2002 | Maesoba et al. |
| 6,557,239 B2 | 5/2003 | Takahashi et al. |
| 6,698,983 B1 | 3/2004 | Kiernan et al. |
| 6,885,123 B2 | 4/2005 | Gorohata et al. |
| 6,894,417 B2 | 5/2005 | Cai et al. |
| 6,938,323 B2 | 9/2005 | Katou et al. |
| 7,034,428 B2 | 4/2006 | Cai et al. |
| 7,140,098 B2 | 11/2006 | Maeda et al. |
| 7,210,215 B2 | 5/2007 | Kato et al |
| 7,293,350 B2 | 11/2007 | Sawada |
| 7,302,750 B2 | 12/2007 | Niimi et al. |
| 7,348,705 B2 | 3/2008 | Cai et al. |
| 7,622,843 B2 | 11/2009 | Cai |
| 2001/0007169 A1 * | 7/2001 | Takahashi et al. .............. 29/596 |
| 2001/0013167 A1 | 8/2001 | Maeda et al. |
| 2002/0053126 A1 | 5/2002 | Maeda et al. |
| 2004/0172805 A1 | 9/2004 | Tokizawa |
| 2005/0166393 A1 | 8/2005 | Sawada |

FOREIGN PATENT DOCUMENTS

| | | |
|---|---|---|
| JP | 59-103546 | 6/1984 |
| JP | 60-241748 | 11/1985 |
| WO | WO-92/06527 | 4/1992 |
| WO | WO-98/54823 | 12/1998 |

OTHER PUBLICATIONS

"Delco Remy Will Shut Down Indiana Starter and Alternator Operations" Entrepreneur article dated Jan. 17, 2003.
"Delco Remy to shut down Anderson plants, lay off 400" Local 2209 article.
Delco Remy International, Inc. Form 10-K Filing for the Fiscal Year Ended Dec. 31, 2003.
Deposition of Silvestre Mendoza (Excerpt) dated Mar. 16, 2011.
Deposition of Stuart Perry (Excerpt) dated Mar. 23, 2011.
Sante Guercioni, "Declaration of Sante Guercioni" with Exhibits A-V, dated Mar. 26, 2012.
Giuseppe Ranalli, "Declaration of Giuseppe Ranalli" with exhibits A-C dated Mar. 26, 2012.

* cited by examiner

METHODS AND APPARATUS FOR TWISTING ROTOR AND STATOR CONDUCTOR ENDS

CROSS-REFERENCE TO RELATED APPLICATIONS

This application is a continuation of U.S. patent application Ser. No. 11/880,290, filed Jul. 20, 2007, which is hereby incorporated by reference herein in its entirety.

BACKGROUND OF THE INVENTION

1. Field of the Invention

The present invention relates to the field of electric motors.

2. Prior Art

Tecnomatic S.p.A., assignee of the present invention, has in the past made a limited number of motor stators and D.C. motor rotors using flat or square wire for the windings. In that regard, it is to be noted that as used herein, "flat" or "square" wire means wire having four substantially flat sides, each joined to adjacent sides, typically by a rounded edge. In the case of square wire, the wire may be formed in the square shape and then coated with typical winding insulation, or in some cases, pre-coated round wire has been rolled into the square shape. Rolling of round wire to a square shape has definite limits if the insulation is not to be damaged, though smaller rounded edges may be achieved if the wire is first formed by drawing or otherwise formed into the square shape and then coated. Even if the wire is first formed in the desired shape and then coated, some degree of rounding on the edges is desired for various reasons, including prevention of surface tension from pulling the coating away from the sharp edges during coating, preventing the sharp edges from cutting through the coating afterward, and preventing electric field concentration on the sharp edges to induce early breakdown. Thus, as used herein, the words "square" or "flat" or equivalent words used to describe the cross-section of an insulated copper wire are used in the general sense and are not to be construed as excluding significant or substantial rounded corners joining the substantially flat sides. "Flat" as used herein and in the claims means having two opposite sides having a greater separation than the other two opposite sides, its width being greater than its thickness. "Straight" as used herein and in the claims means substantially free of bends. Accordingly, either a flat or a square conductor may or may not be straight. "Rectangular" as used herein is a more general term meaning flat or square, square being a special case of rectangular wherein the dimension between two opposite sides is equal to the dimension between the other two opposite sides.

In the prior art stators, the wire has been cut to the desired length and stripped, then bent into a hairpin shape by hand on a one at a time basis, then the two legs of the hairpin separated one hairpin at a time and hand inserted into one end of a stator, with the stripped ends of the wires sticking out of the other end of the stator being all bent all in one row uniformly in one direction and all in the adjacent row uniformly bent in the opposite direction so interconnection of wires in the two rows forming a given phase could be welded, one at a time, to provide the stator windings. However, to bring out the connections to the phases, and to interconnect phases, the corresponding wires needed to be re-bent to isolate them from the connections within each phase, something again previously done by hand.

The use of the flat or square wire for the windings produces very efficient and high power to weight ratio motors because of the greater cross-section of copper that can be put into a winding slot. However, the procedure described above is slow and highly labor intensive, and not suitable for a mass produced motor.

DETAILED DESCRIPTION OF THE PREFERRED EMBODIMENTS

Figure 1:
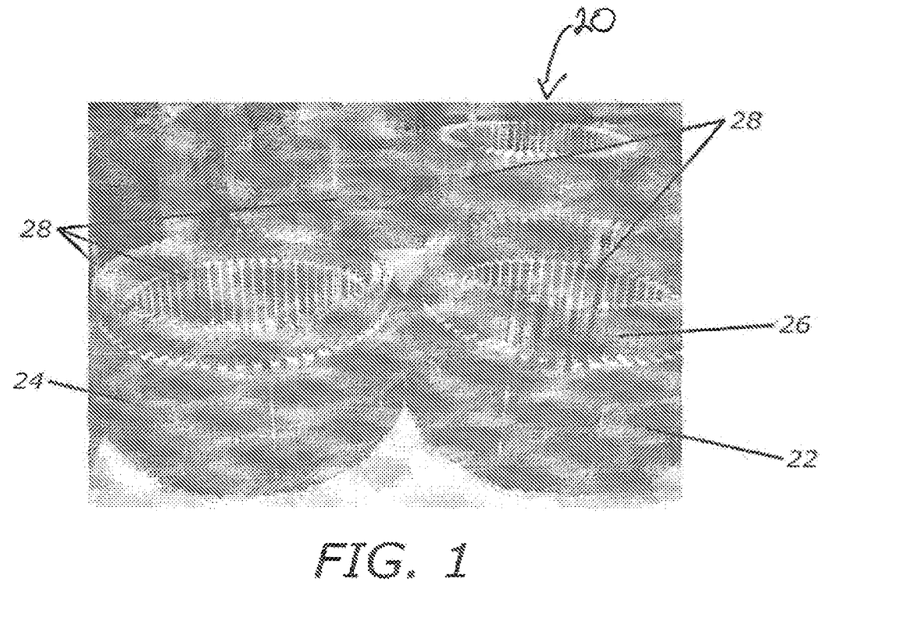
FIG. 1 shows three motor stators, one insulated but unpopulated with stator conductors, one populated with stator conductors with stator conductor ends not yet bent, and one populated with stator conductors with stator conductor ends bent using the methods and apparatus of the present invention.

First referring to FIG. 1, three motor stators 20, 22 and 24 may be seen. Stator 20 in the background of the Figure is an insulated motor stator not yet populated with stator conductors. Stator 22, on the other hand, is populated with rectangular stator conductors 26. The lower ends of these stator conductors are bent so that an individual stator conductor spans a fixed number of stator slots, specifically, six stator slots in an exemplary embodiment. In a typical motor stator of the type described, certain stator conductors have one side thereof longer than the other conductors to provide terminal connections for the completed stator winding. In a three phase motor, three such longer stator conductors 28 are used, all three being visible in stator 24 of FIG. 1.

The purpose of the present invention is to provide a method for twisting the upper ends (referenced to the orientation of FIG. 1) of the stator conductors 26 as shown in stator 22 so that the ends of most of these conductors may be welded to the end of another stator conductor a fixed number of slots away, again in the exemplary embodiment spaced six slots away. In so bending, it is to be noted that the leads 28 must be bent through a different angle so as to not interfere with the welded connection of stator conductors with adjacent stator conductors. Similarly, phase connections need to be made separate and apart from the interconnection of individual stator connectors, and accordingly, it is desired to also bend the ends of each stator conductor that is to be used for phase interconnections through a different angle than adjacent stator conductors. In the exemplary embodiment sixty stator slots are used, 6 degrees apart. Since each turn of the stator winding spans six motor slots, the ends of conductors 26 on stator 22 must each be bent to span 3 degrees. In that regard, in the exemplary embodiment there are four layers of flat stator conductors lying on top of each other in each slot with the wide portion of the rectangular conductor being circumferentially oriented. Consequently, to bend the conductors as shown in stator 24, the conductors must be held against twisting, as otherwise they will, tend to twist to bend around the thinner dimension. Further, as may be seen in FIG. 1, the upper ends of the conductors 26 as well as conductors 28 are stripped of insulation, with the stripped ends of conductors 26 being maintained in a substantially vertical orientation, as viewed in FIG. 1. The terminal leads 28 as well as one end of each stator conductor that is to be used for phase connections are bent through a lesser angle so as to be positioned between locations at which the ends of most stator conductors are welded together.

In accordance with the present invention, the ends of all stator conductors shown in the stator 22 of FIG. 1 are simultaneously bent to the position shown on stator 24. As shown in that Figure, the outer layer of stator conductor ends is bent in a counterclockwise direction, the next layer (the other end of the stator conductors in the outer layer) in a clockwise direction, followed by a third layer bent in a counterclockwise direction, and the fourth layer (the other end of the stator conductors in the third layer) bent in a clockwise direction.

Figure 2:
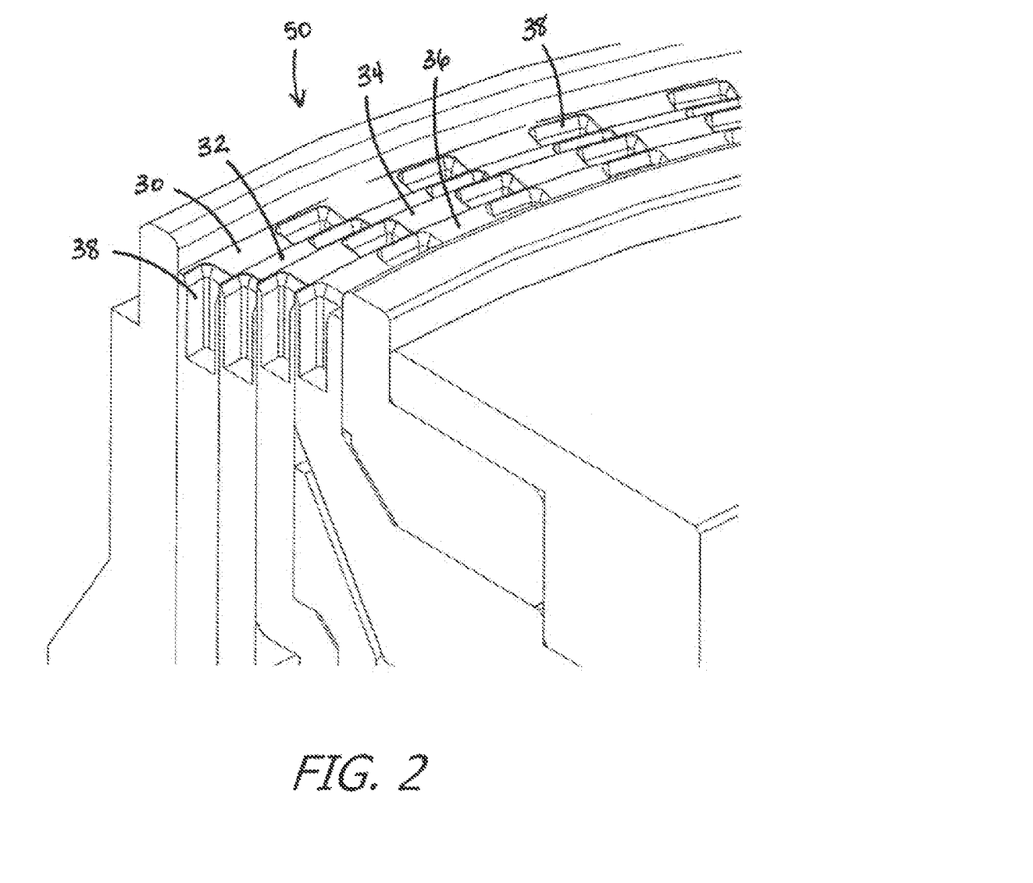
FIGS. 2 and 3 are cross sections of an exemplary bending fixture in accordance with the present invention.
Figure 3:
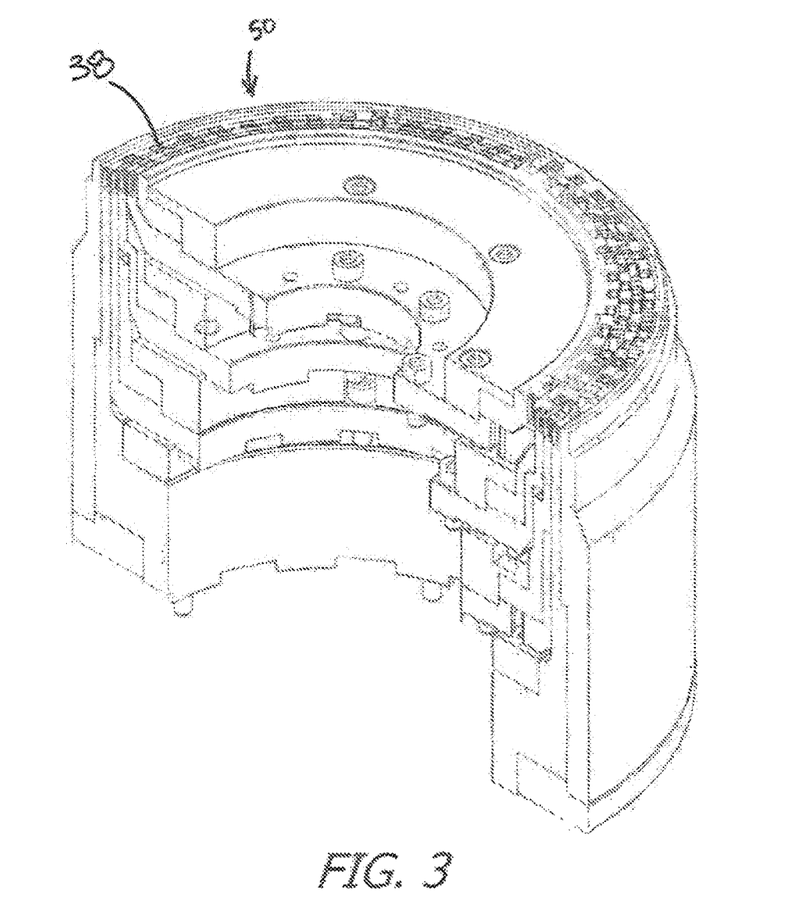

Now referring to FIGS. 2 and 3, a cross-section of a bending fixture in accordance with the present invention may be seen. As may be best seen in FIG. 2, the fixture includes four concentric ring-like members 30, 32, 34 and 36, each having either pockets or slots 38 therein, each for receiving the end of a stator conductor as shown on stator 22 of FIG. 1. In general the slots or pockets 38 shown in FIGS. 2 and 3 are of limited depth, though those for the input leads 28 of FIG. 1 extend along the entire height of the fixture with clearance provided as may be required for proper operation of the fixture. As used herein and in the claims to follow, a pocket may be defined by a depression or hole in a member surrounded by part of that member, and further includes a pocket defined by a slot in one member effectively closed by a surface or wall of an adjacent member.

Figure 4:
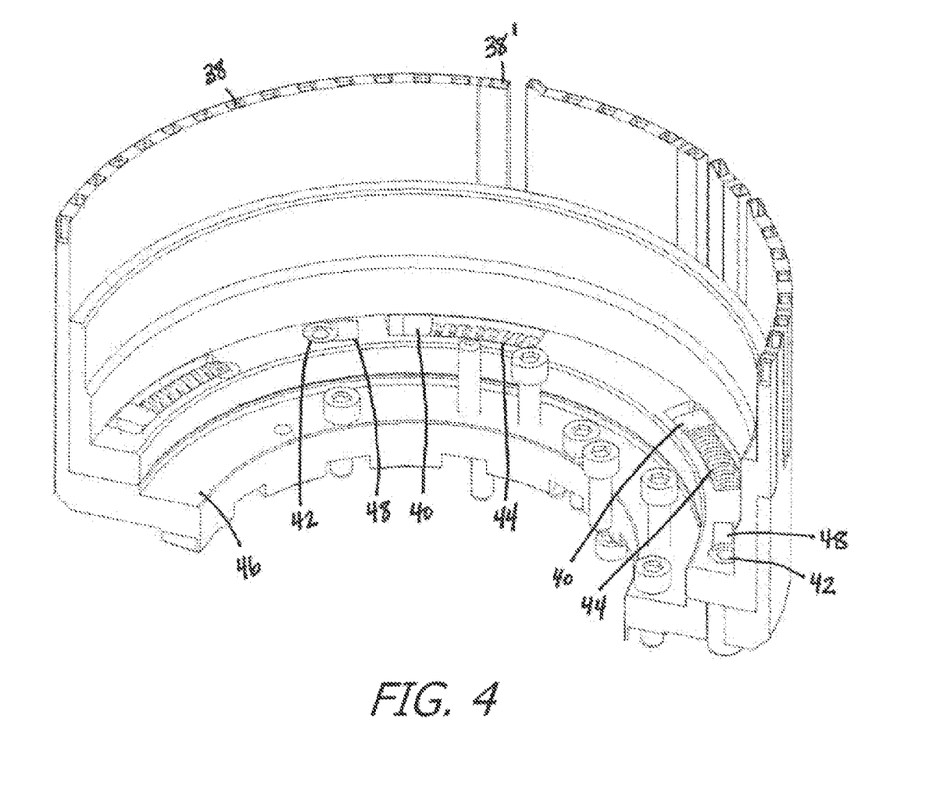
FIG. 4 is a view of part of an exemplary ring assembly used in the method and apparatus of FIGS. 2 and 3.

Now referring to FIG. 4, an exemplary one of the rings 30, 32, 34 and 36 of FIG. 2 may be seen. While the rings are of slightly different configuration and obviously of different diameters as may be seen in FIGS. 2 and 3, the general structure of the rings or most of them is the same. In particular, pockets or slots 38 are equally spaced around most of the periphery of the ring. However in atypical ring, one or more slots or pockets 38' is mounted not rigidly to the structure of the main part of the ring, but rather is supported on a separate ring integral with, or at least attached to, protrusions 40 within slots of the main ring structure. Coil springs 44 force the protrusions 40 to the position shown after removing one stator with bent stator lead ends, with pocket or slot 38' being located against the side of the main circular structure. With this general structural organization with the ends of the stator conductors in the pockets 38 and 38', rotation of the base 46 of the main ring structure in the counterclockwise direction will initiate the bending of most of the ends of the stator conductors. However, pockets 38' will at least initially not be positively driven, with the resistance of the ends of the stator conductors in those pockets preventing the rotation of the member holding pockets 38' with the main ring against the springs 44. Pins 42, which are fastened to the same structure as pockets 38, rotate therewith within slots 48 in the main ring structure until reaching the ends of the slots, after which the structure supporting pockets 38' begins to rotate with the main structure supporting pockets 38. Thus there is a lost motion between the rotation of the main ring structure holding pockets 38 and the structure holding pockets 38' before the two rotate together. The angle of rotation of the lost motion before the two sets of pockets are driven in unison is the difference in angle of the bending of the regular stator conductor ends and the stator conductor ends for the phase connections and the terminal conductors. Of course, for rings rotating in the opposite direction, lost motion structure is changed to reverse the lost motion direction. Also while all rings in the exemplary embodiment include the lost motion structure, this is not a limitation of the invention.

Figure 5:
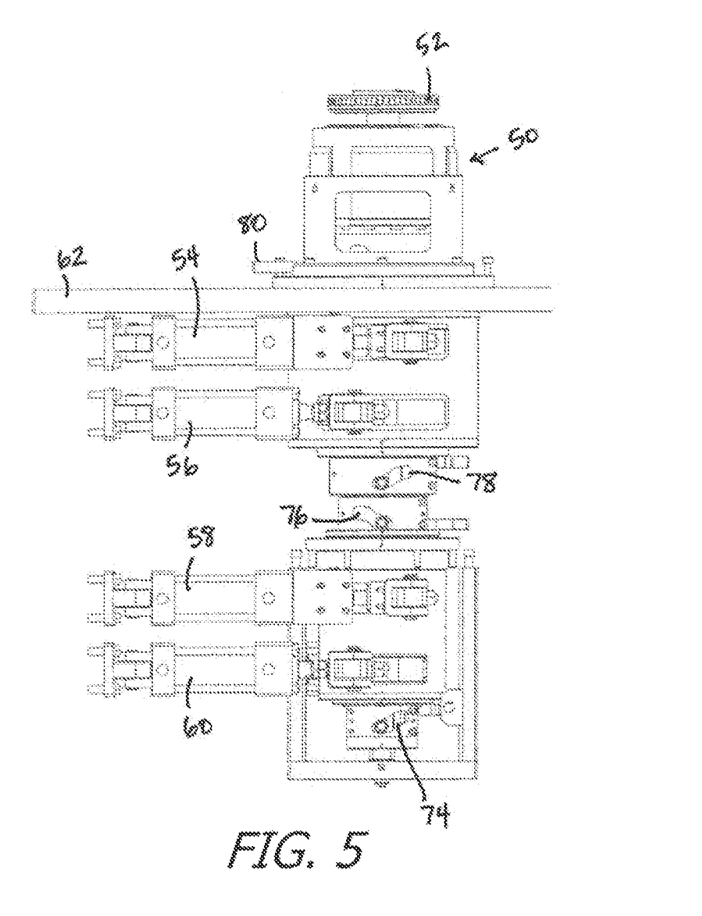
FIG. 5 is a side view of an exemplary bending station for carrying out the methods of the present invention.

Now referring to FIG. 5, an exemplary bending station may be seen. The bending fixture 50 shown in FIGS. 2 and 3 is located in the upper region of the bending station. At the top of the bending station is a stripper 52 on which the stator will be positioned. The stripper 52 is mounted for vertical motion, being in its lowermost position during bending and then raised to extract the ends of the stator conductors, except for the entire leads, from the bending fixture 50. The various rings 30, 32, 34 and 36 (FIG. 2) are driven in rotation by pneumatic actuators 54, 56, 58 and 60, respectively. The actuators, as well as bending fixture 50, are supported by a table 62 structure of conventional design, the details of which are not shown. It will be noted from the Figure that the actuators alternate in direction of actuation, as of course the rings themselves alternate in direction of rotation. Each actuator in the exemplary embodiment is actually a pair of diametrically disposed actuators to provide the desired torque on the respective drive member without significant side force.

Figure 6:
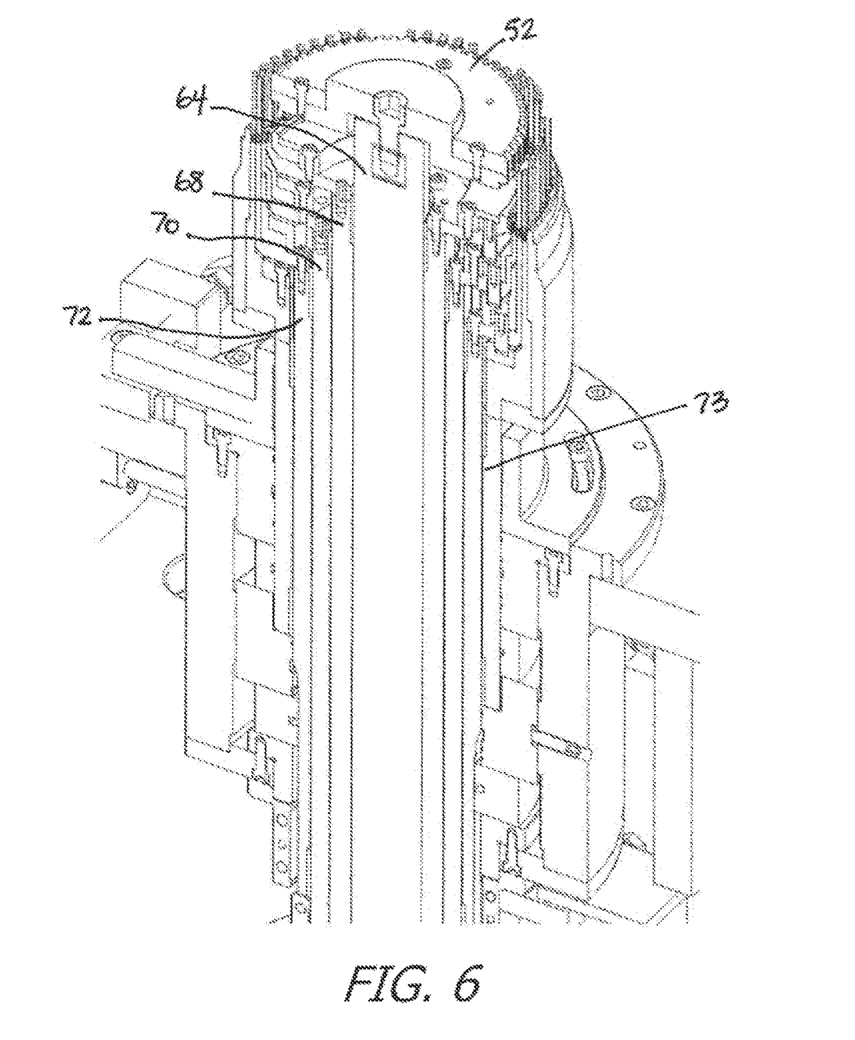
FIG. 6 is a cross section of part of the bending station illustrating part of the drive system therefor.

FIG. 6 shows a cross-section of part of the bending station shown in FIG. 5, generally illustrating the drive mechanism for the various rings. In particular, a central shaft 64, configured for vertical motion, supports the stripper 52. Concentric therewith is a tubular member 68, driven in rotation by pneumatic actuator 60 (FIG. 5). Concentric therewith is a larger tubular member 70 driven in rotation in the opposition direction by pneumatic actuator 58. A third concentric tubular member 72 driven by actuator 56, and finally a fourth tubular member 73 driven by actuator 54. Thus these concentric drive members are coupled to the pneumatic actuator pairs 54 through 60, with the innermost ring being driven by the lowermost actuator, etc.

Referring again to FIG. 1, it will be noted that as the stator conductors are bent, they bend in an arc. That arc is greatest for the ends of the stator conductors in the outermost circle and reduces to the innermost circle. Accordingly in the preferred system, in order for the four rings of the fixture to follow the arc of the respective circle of stator conductor ends, four cam assemblies 74, 76, 78 and 80 are provided, as shown in FIG. 5. The lowest cam assembly 74 controls the drive member for the innermost ring 36 (FIG. 2), with each additional cam assembly thereabove driving the next outer respective ring 34, 32 and 30, respectively. These cams raise the respective drive members and in turn raise the respective ring in a controlled manner so that the pockets in the bending fixture follow the arc of the bend, retaining the tip ends of the stator conductors in the vertical orientation without longitudinal sliding or longitudinal stressing of the stator conductors. Because the arc is somewhat different for each ring, four cam assemblies are used rather than merely one. Of course one could use a single cam assembly, or alternatively, similarly control the elevation of the stripper 52 to approximately follow the arcs, though this is not preferred because of the lack of precision in so doing. One could also simply rotate one of each pair of rings (30 or 32, and 34 or 36) in the appropriate direction, raising all rings equally or unequally as the bending proceeds or lowering the stripper supporting the stator (or both), though this would also require the rotation of the rings through twice the angle of the preferred embodiment, and rotation of the stripper supporting the stator through half the ring rotation angle.

After the ends of the stator conductors are bent as described, the actuators are depressurized or even slightly driven in the opposition direction to relieve spring-back before the extractor 52 is raised for extraction purposes.

While the invention has been described with respect to exemplary embodiments for bending the ends of rectangular stator conductors, it is to be noted that the invention is also applicable to the bending of rectangular rotor conductors. Thus there has been described herein motor stator conductor bending methods and apparatus which bends all or substantially all, or at least a majority of the free ends of motor stator conductors for interconnection with associated stator conductors, which further may include the bending of stator conductors to a different angle for phase interconnections as well as longer stator conductors for input terminals. While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of bending the free ends of rectangular motor winding conductors comprising:
    providing a bending fixture having four rings with a plurality of pockets configured to receive winding conductor ends disposed on each ring, each ring being concentric with an axis of the bending fixture, wherein a first ring and a third ring are rotatable about the axis through a first angle relative to a second ring and a fourth ring, and the plurality of pockets comprises a lost motion pocket disposed on one of the rings, the lost motion pocket being rotatable through a second angle smaller than the first angle;
    placing a rotor or stator into the bending fixture with free ends of rectangular motor winding conductors disposed on the rotor or stator extending into the pockets of the four rings; and
    rotating the first and third ring through the first angle relative to the second and fourth rings to bend the free ends of the rectangular motor winding conductors, wherein the lost motion pocket is rotated through the second angle when the first ring is rotated through the first angle.

2. The method of claim 1, comprising adjusting a distance between the first ring and the rotor or stator in a direction along the axis during rotation of the rings through the first angle.

3. The method of claim 2, comprising adjusting a distance between each of the second, third, and fourth rings and the rotor or stator in a direction along the axis during rotation of the rings through the first angle.

4. The method of claim 3, comprising adjusting the distances between each of the four rings and the rotor or stator by an equal distance along the axis during rotation of the rings through the first angle.

5. The method of claim 3, comprising adjusting the distances between each of the four rings and the rotor or stator by different distances along the axis during rotation of the rings through the first angle.

6. The method of claim 2, comprising holding the rotor or stator stationary while adjusting the distance between the first ring and the rotor or stator during rotation of the rings through the first angle.

7. The method of claim 6, comprising moving each ring closer to the rotor or stator during rotation of the rings through the first angle.

8. The method of claim 1, comprising providing a pneumatic actuator coupled to the first ring, and driving rotation of the first ring with the pneumatic actuator.

9. The method of claim 8, comprising providing a tubular member coupling the first ring to the pneumatic actuator, and transferring rotational force from the pneumatic actuator to the first ring through the tubular member.

10. The method of claim 9, wherein the tubular member couples the first ring to a cam assembly, the method comprising transferring axial translation force from the cam assembly to the first ring.

11. The method of claim 1, wherein the first ring is an outermost ring, the fourth ring is an innermost ring, and the first and third rings are configured to rotate in a direction about that axis that is opposite a rotation direction of the second and fourth rings.

12. The method of claim 11, comprising rotating the first and third rings in a counter-clockwise direction, and rotating the second and fourth rings in a clockwise direction.

13. The method of claim 1, comprising providing a central shaft concentric with the axis of the bending fixture and disposed within central openings of each of the four rings, the central shaft being coupled to a stripper.

14. The method of claim 13, comprising placing free ends of the rectangular motor winding conductors into the stripper.

15. The method of claim 14, comprising moving the stripper in the direction along the axis, and extracting ends of the winding conductors.

16. The method of claim 1, wherein the lost motion pocket comprises a protrusion that extends into a slot disposed on the first ring.

17. The method of claim 16, wherein the first ring comprises a spring that resists rotation of the protrusion and the lost motion pocket when the first ring begins to rotate.

18. The method of claim 17, wherein the first ring comprises a pin coupled to the protrusion and the spring, the pin contacting an end of the slot after the first ring begins to rotate.

19. The method of claim 18, wherein the lost motion pocket begins to rotate with the first ring after the pin contacts the end of the slot.

20. The method of claim 1, comprising moving the stator or rotor in the direction along the axis during rotation of the rings through the first angle.

* * * * *